Jan. 5, 1960     C. H. STRANDBERG     2,919,509
FILM FRAME OR SLIDE PACKAGING BOX AND VIEWER
Filed Jan. 31, 1958     2 Sheets-Sheet 1

INVENTOR
CARL H. STRANDBERG

BY Walter S. Paul
ATTORNEY

Jan. 5, 1960 C. H. STRANDBERG 2,919,509
FILM FRAME OR SLIDE PACKAGING BOX AND VIEWER
Filed Jan. 31, 1958 2 Sheets-Sheet 2
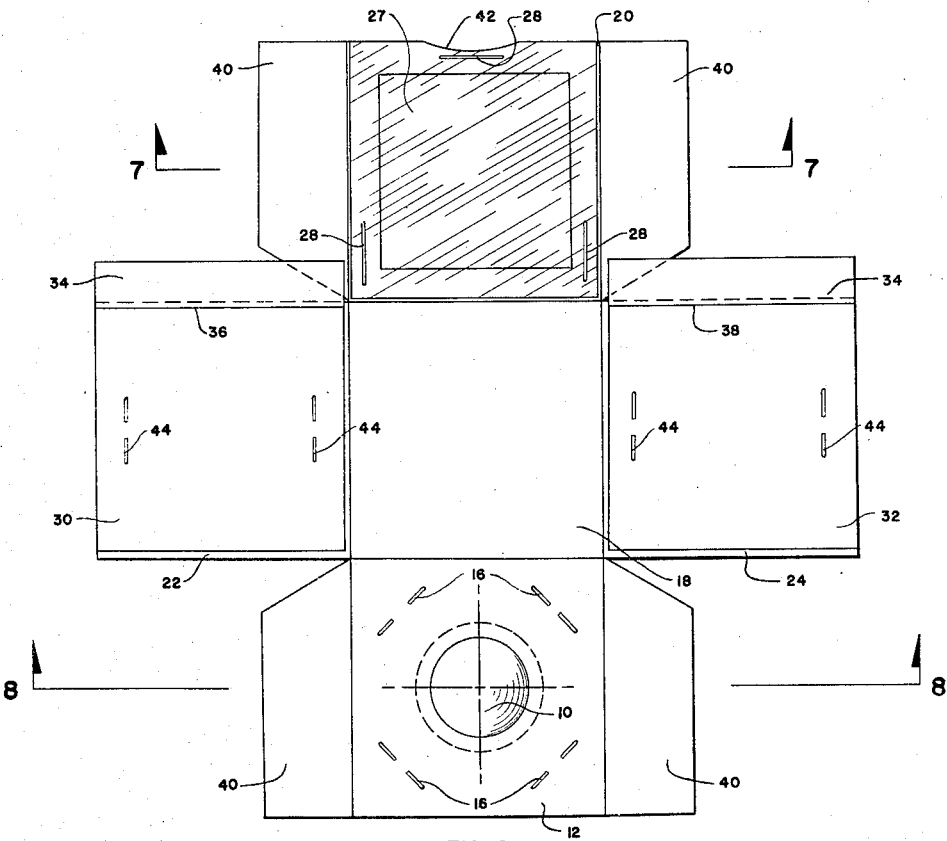
INVENTOR
CARL H. STRANDBERG
BY *Walter S. Paul*
ATTORNEY

United States Patent Office 2,919,509
Patented Jan. 5, 1960

2,919,509

FILM FRAME OR SLIDE PACKAGING BOX AND VIEWER

Carl H. Strandberg, Silver Spring, Md.

Application January 31, 1958, Serial No. 712,482

5 Claims. (Cl. 40—63)

The present invention relates to film frame packing boxes which serve also as viewers of the individual frames.

The principal object of this invention is to provide an inexpensive viewer with a set of developed film frames comprising the box in which the frames are packaged, such as when a roll of film is developed or when sets of scenic or other commercially photographed film frames or slides are stored or sold in package lots, whereby the frames can be suitably viewed by the receiver of the set without the necessity of having a separate viewer on hand.

A further object is to modify the mailing box for developed film frames by incorporating a simple plastic viewer lens in one end of the box and a transparent or translucent window in the opposite end against which a single frame may be held for viewing.

A further object is to modify the mailing box for developed stereoscopic film frames by incorporating a pair of simple plastic stereoscopic lenses in one side of the box and a pair of transparent or translucent windows in the opposite side against which a single frame of the stereoscopic film may be held for stereoscopic viewing.

A further object is to make the above boxes from flat sheet blanks adaptable for quick assembly at the time of packaging and requiring minimum storage space previous to use.

A further object is to make the covers for the above boxes of flat sheet blanks similarly adaptable for quick assembly at the time of packaging and requiring minimum storage space previous to use.

Figure 1:
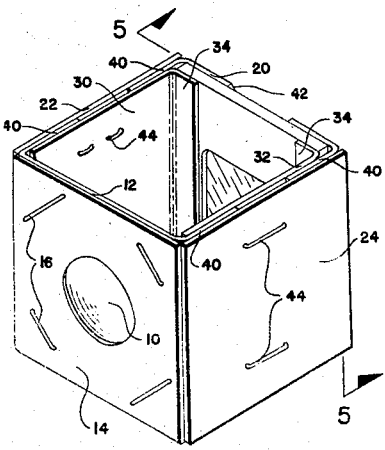
Figure 2:
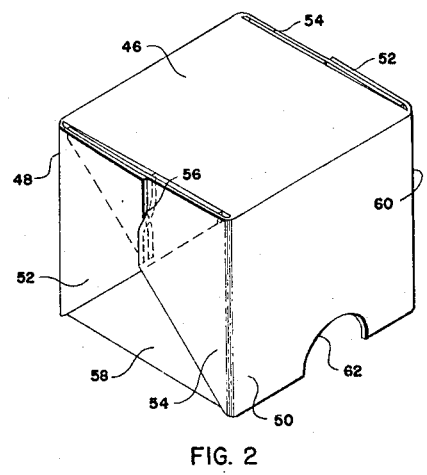
Figure 3:
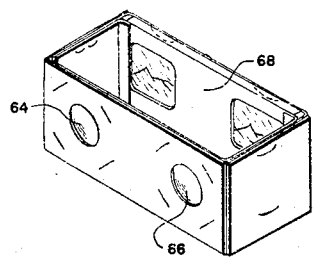
Figure 4:
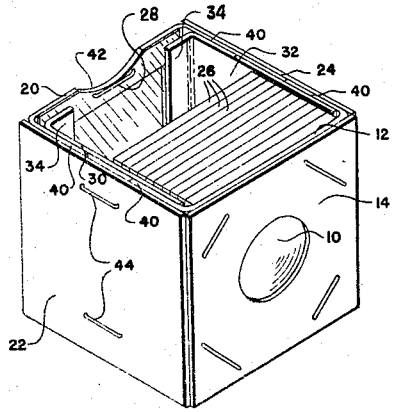
Figure 5:
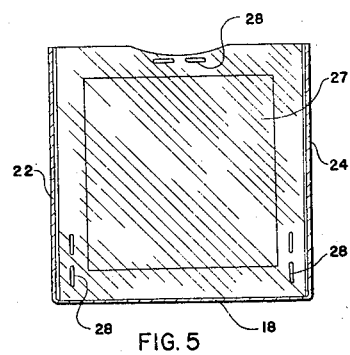

Other and more specific objects will become apparent in the following detailed description of a preferred form of the invention as illustrated in the accompanying drawings, wherein:

Fig. 1 is a perspective view of the viewer-box showing its assembly and a film frame in place for viewing, Fig. 2 is one form of cover which may be used for the package, Fig. 3 is a modification of the viewer-box for telescopic film frames, Fig. 4 is a perspective view of a viewer-box similar to that shown in Fig. 1, partially filled with a set of film frames or slides, Fig. 5 is an elevational section taken on the line 5—5 in Fig. 1, Fig. 6 is a plan view of the flat sheet composite blank for quickly folding and assembling into the box form of the viewer-box, Fig. 7 is a section taken along the line 7—7 of Fig. 6, and Fig. 8 is a section taken along the line 8—8 of Fig. 6.

This invention in its broadest scope comprises a box for packaging a set of film frames or slides having a lens in one wall of the box and a window in the opposite wall for viewing individual film frames held across the window, thus providing an inexpensive viewer which serves also for packaging the film frames or slides. Or, stated another way, using the packaging container, by a simple modification, incorporating an inexpensive plastic lens in one wall, to serve as a handy viewer.

The drawings illustrate a simple way to make this viewer-box container for packaging a set of film frames or slides.

The simple inexpensive lens 10 is incorporated in one side 12 of the blank form, as shown in Figs. 6 and 8. The lens 10 may be held over the lens opening in this side by a sheet of material 14 having a similar opening clipped to said side by staples 16 around the periphery of the lens 10, the lens diameter being slightly larger than that of the opening. Side 12 extends from one edge of the bottom 18 of the box. The opposite side 20 of the box extends from the opposite edge of the bottom 18, and the remaining two sides 22 and 24 extend from the remaining edges of the bottom 18. The blank is scored around the edges of the bottom 18 to facilitate folding the sides up during assembly of the box into the form shown in Fig. 1 having the proper dimensions for packing up to a predetermined number of frames 26 in a set.

The opposite side 20 is provided with a window which may be covered over by a thin sheet of translucent parchment or paper 27 clipped by staples 28 to said side.

The sides 22 and 24 may be provided with liners 30 and 32, respectively, with flaps 34, foldable inwardly at the score lines 36 and 38 to form vertical slide grooves adjacent the side 20, into which a film frame or slide 26 may be dropped for viewing, when the box is assembled.

Sides 18 and 20 each have a pair of flaps 40 extending from their scored vertical edges, each flap being folded and frictionally held between the adjacent side and its lining, when the box is assembled.

Side 20 has a part of its upper edge cut away at 42 to provide a finger grip clearance at the top of any film frame that may be in the vertical grooves, so that said frame may be readily removed after it is viewed.

The liners 30 and 32 may be clipped to their respective sides 22 and 24 by staples 44.

A box cover or top may be formed as shown in Fig. 2 of a blank having a top wall 46, with the four side walls extending from its edges and folded downwardly, two of these side walls 48 and 50 at opposite edges of the top wall 46 having substantially triangular flaps 52 and 54 extending from their opposite vertical edges and being slit vertically at their middle half way from opposite directions for interlocking connection, as shown at 56, to hold the blank in assembled form, without the aid of any clips, staples or other extraneous means. Either pair of opposite verticle walls, 48 and 50 or the other pair 58 and 60, may be cut out at their bottom edges as shown at 62, to provide finger grip spaces at opposite sides of the bottom of the box to facilitate opening or lifting the cover from the box when unpacking.

Thus, it is possible to cheaply make up a lot of the blanks illustrated in Figs. 6 to 8 and the cover blanks in flat form for compact storage and ease of handling until their actual use, when they may be quickly and easily assembled as needed for packaging. The dimensions of the boxes may be modified to suit the size and number of film frames or slides in a set, so that different capacities, as well as sizes of slides may be accommodated, the lens object distance being made to correspond with the viewing distance resulting in any modification of the box.

A further modification of the box may be made as shown in Fig. 5, using two lenses 64 and 66, to accommodate stereoscopic film frames or slides 68, such as are produced by stereoscopic double exposure cameras at corresponding angles.

Obviously, many other modifications in the details of construction and selection of suitable materials may be made without departing from the spirit and scope of the present invention, as defined in the appended claims.

What is claimed is:

1. A collapsible container assembly for packaging film slides comprising a pair of flat blanks of foldable sheet material for forming complementary rectangular open top box and cover, each blank having a rectangular central portion and oppositely extending rectangular side and end portions, the end portions having side flaps for attachment of the corresponding side flaps to the side portions of the box or cover when folded into a box form so that the cover will fit snugly over the box to form the container assembly, said box blank having at least one lens in one of its end portions and at least one window in its other end portion, the edges of the side portions adjacent said window end being foldable inwardly to provide side grooves in the box into which a slide may be inserted for viewing through said lens.

2. A collapsible container assembly for packaging film slides as defined in claim 1, said one end portion having a pair of stereoscopic viewing lenses and the other end portion having two windows for accommodating a stereoscopic film slide.

3. A box as defined in claim 1, said window being covered over by a sheet of translucent material.

4. A box as defined in claim 1, said flat blanks having scores at the folding edges, and interlocking means on said side flaps for holding each blank in box form without the aid of extraneous fixing means.

5. A box and cover as defined in claim 4, said interlocking means on said side flaps of said end portions cooperating with said side portions in assembled position to frictionally hold each blank in box form.

References Cited in the file of this patent

UNITED STATES PATENTS

| | | |
|---|---|---|
| 2,071,120 | Harlow | Feb. 16, 1937 |
| 2,071,121 | Harlow | Feb. 16, 1937 |
| 2,543,240 | Hutchinson | Feb. 27, 1951 |
| 2,580,164 | Flynn | Dec. 25, 1951 |

FOREIGN PATENTS

| | | |
|---|---|---|
| 11,139 | Great Britain | Jan. 2, 1908 |
| 1,099,211 | France | Aug. 31, 1955 |